(12) United States Patent
Mukaiyama

(10) Patent No.: US 6,291,914 B1
(45) Date of Patent: Sep. 18, 2001

(54) ROTATIONAL ANGLE SENSOR

(75) Inventor: Ryuji Mukaiyama, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/544,160

(22) Filed: Apr. 6, 2000

(30) Foreign Application Priority Data

Apr. 8, 1999 (JP) .................................. 11-101366
Apr. 8, 1999 (JP) .................................. 11-101367

(51) Int. Cl.[7] .............................. B62D 5/04; B62D 15/00
(52) U.S. Cl. ............................ 310/68 B; 310/71; 701/41
(58) Field of Search ............................... 310/68 B, 68 R, 310/71; 701/41, 43, 42; 180/400, 415, 446; 702/41

(56) References Cited

U.S. PATENT DOCUMENTS

| 5,004,915 | * | 4/1991 | Umehara et al. ............ 250/231.14 |
| 5,065,324 | * | 11/1991 | Oshita et al. ........................... 701/41 |
| 5,144,277 | | 9/1992 | Ishihara et al. ...................... 73/118.2 |
| 5,571,960 | | 11/1996 | Tateishi et al. ....................... 338/154 |
| 5,889,461 | | 3/1999 | Ebata ................................... 338/160 |

FOREIGN PATENT DOCUMENTS 1-107903    7/1989   (JP) .

* cited by examiner

Primary Examiner—Nicholas Ponomarenko
Assistant Examiner—Judson H. Jones
(74) Attorney, Agent, or Firm—Brinks Hofer Gilson & Lione

(57) ABSTRACT

A terminals is abutted against an inner wall of a receptacle portion formed in a cylindrical housing and is opposed to a hole through which a lead wire is inserted, the terminal and one end portion of the lead wire being soldered together near an opening of the housing. A coiled spring is accommodated within an accommodating portion formed in the cylindrical housing, and a rotor having retaining portions for abutment against stopper portions formed at the peripheral edge of an opening portion of the housing and which closes the housing open portion is fixed to a rotary shaft.

8 Claims, 14 Drawing Sheets

ROTATIONAL ANGLE SENSOR

BACKGROUND OF THE INVENTION

1. Field of the Invention

The present invention relates to a rotational angle sensor provided in a vehicle or the like for example and which is used for detecting a torque generated in a steering wheel in accordance with a steering operation of the steering wheel.

2. Description of the Related Art

A conventional rotational angle sensor, which is shown in FIG. 21, is provided with a cylindrical housing 41 made of an insulating synthetic resin and which is open at both end portions thereof. An outer wall of the housing 41 has an annular stepped portion 41a. The interior of the housing 41 is partitioned into a receptacle portion 43 and an accommodating portion 44 by means of a partition wall 42. A bearing 45 is attached to the partition wall 42 by insert molding. A rotary shaft 46 is inserted into the bearing 45 rotatably. Both end portions of the rotary shaft 46 are positioned inside the receptacle portion 43 and outside the housing 41, respectively. A rotary member 48 which supports a slider 47 is mounted on one end portion of the rotary shaft 46 positioned within the receptacle portion 43, while a lever 49 is caulked to an opposite end portion of the rotary shaft 46 at a position outside the housing 41. A ring-like seal member 50 for sealing the interior of the receptacle portion 43 is press-fitted into the accommodating portion 44.

A holder 52 with a circuit board 51 fixed thereto is press-fitted into the receptacle portion 43 from an open end of the housing 41 and is installed therein while the slider 47 is brought into sliding contact with a resistor pattern and a current collector pattern (neither shown) both formed on the circuit board 51. A terminal 53 connected to the resistor pattern and the current collector pattern (neither shown) is supported by the circuit board 51. One end portion of the terminal 53 is drawn out to the back side of the holder 52 through a hole 52a formed in the holder 52 and is soldered to a lead wire 54 which is inserted into the interior of the housing 41 through a hole 41b formed in the housing. The interior of the receptacle portion 43 is filled, on the back side of the holder 52, with an insulating adhesive 55, and the connection of the terminal 53 and the lead wire 54 is buried in the adhesive.

A method for assembling this conventional rotational angle sensor will now be described. First, the rotary member 48 with the slider 47 supported thereon is inserted into the receptacle portion 43 from an open end of the housing 41. Next, the rotary shaft 46 is inserted through the bearing 45 from the accommodating portion 44 side and the rotary member 48 is mounted to one end portion of the rotary shaft 46 by a suitable means such as press-fitting or caulking, making the rotary shaft 46 and the rotary member 48 integral with each other. Next, the sealing member 50 is press-fitted into the accommodating portion 44 of the housing 41.

Next, with one end portion of the terminal 53 drawn out to the back side of the holder 52 through the hole 52a, the circuit board 51 with the terminal 53 supported thereon is fixed to the holder 52. Then, the holder 52 is press-fitted into the receptacle portion 43 from an open end of the housing 41 and is secured to the housing. Subsequently, the lead wire 54 is inserted into the receptacle portion 43 through the hole 41b formed in the housing 41 and is soldered to one end portion of the terminal 53. Further, the insulating adhesive 55 is charged into the receptacle portion 43 and is cured, then the lever 49 is caulked to the opposite end portion of the rotary shaft 46.

Assembling of the conventional rotational angle sensor is completed in this way. After the assembly, the rotary member 48 rotates integrally with the rotary shaft 46 while the circuit board 51 is prevented its movement axially (in arrow A directions) of the rotary shaft. With rotation of the rotary member 48 the slider 47 slides on resistor and current collector patterns (not shown). Further, the insulating adhesive 55 insulates the soldered portion of the terminal 53 and the lead wire 54 from the exterior and seals the interior of the receptacle portion 43 in cooperation with the sealing member 50 to prevent the entry of dust and moisture into the receptacle portion. At the same time, the lead wire 54 is fixed to protect it sufficiently from pulling.

In the conventional rotational angle sensor thus constructed and assembled there is used, for example, a conversion mechanism (not shown) mounted on a vehicle and provided with a converter portion which converts a resistance force generated in a steering wheel (not shown) into a linear motion in proportion to a frictional force between vehicular wheels and a road surface while the steering wheel is operated. The portion located on the lever 49 side relative to the stepped portion 41a is positioned within a casing of the conversion mechanism and the lever 49 is brought into engagement with the converter portion. Further, the lead wire 54 is connected to a control circuit (not shown) which controls an electric motor (not shown) connected to the steering wheel, and with a predetermined voltage applied to resistor and current collector patterns (not shown) from the control circuit, the rotational angle sensor is used.

When a vehicle driver operates the steering wheel, a resistance force is generated in the steering wheel, and the foregoing converter portion converts this resistance force into a linear motion to rotate the rotary shaft 46 via the lever 49. With this rotation, the slider 47 slides on the resistor and current collector patterns (not shown), resulting in that a voltage corresponding to the position of the slider 47 on those patterns is outputted via the terminal 53 and the lead wire 54. In accordance with a detection signal of the resistance force thus obtained the control circuit controls the operation of the electric motor so as to diminish the resistance force. It follows that an auxiliary steering torque has been imparted to the steering wheel. Consequently, the aforesaid resistance force decreases and it is possible to lighten the burden of the vehicle driver in steering operation.

In the above conventional rotational angle sensor, however, since one end portion of the terminal 53 is spaced a distance L from the hole 41b formed in the housing 41, work is needed to conduct the lead wire 54 inserted into the receptacle portion 43 from the hole 41b further up to one end portion of the terminal 53. Thus the connecting work for connection between the terminal 53 and the lead wire 54 has so far been extremely complicated.

Further, since the connection between the lead wire 54 and the terminal 53 is required to have an extremely high tensile strength, it is necessary that the lead wire 54 be buried sufficiently into the insulating adhesive 55. Consequently, in the conventional rotational angle sensor, an axial length (in arrow A directions) of the rotary shaft 46 becomes larger. As a result, the portion located on the lead wire 54 side with respect to the stepped portion 41a projects largely from the casing of the conversion mechanism (not shown), thus giving rise to the problem that a large space for accommodating the projecting portion is required in the vehicle.

FIGS. 22 and 23 illustrate another conventional rotational angle sensor. This rotational angle sensor has a housing 101 whose interior is hollow and which comprises a cylindrical small-diameter portion 102 and a cylindrical large-diameter portion 103 both formed integrally in a stepped fashion. A bearing 104 is press-fitted in the cylindrical small-diameter portion 102 and a rotary shaft 106 with a rubber O-ring 105 fitted thereon is supported rotatably by the bearing 104. A disc-like rotary member 108 with a bifurcated slider 107 carried thereon is fitted on one end portion 106a of the rotary shaft 106, while a rotor 109 is mounted on an opposite end portion 106b of the rotary shaft with a screw 110. When the rotor 109 is rotated, the rotary member 108 rotates integrally with the rotary shaft 106.

A disc-like circuit board 111 is fitted in the housing 101 and is opposed to the rotary member 108. An arcuate resistor pattern 112 and a circular current collector pattern 113 are formed on the surface of the circuit board 111, and the slider 107 is in contact with the resistor pattern 112 and the current collector pattern 113. Terminal such as eyelet pieces (not shown) are fixed to both ends of the resistor pattern 112 and also to the current collector pattern 113, and a lead wire 115, which is connected to the terminals by solder 114, is drawn out to the exterior of the housing 101. Further, on the back side of the circuit board 111 an insulating adhesive 116 is charged into the housing 101 to seal the interior of the housing in cooperation of the O-ring 105.

A coiled spring 117 is mounted outside the cylindrical small-diameter portion 102 and is in this state placed on a top plate 103a of the cylindrical large-diameter portion 103. One end 117a of the coiled spring 117 is engaged with an engaging hole 103b formed in the top plate 103a, while an opposite end 117b thereof is engaged with the rotor 109. On the top plate 103a is provided a stopper mechanism (not shown) to restrict a rotational angle range of the rotor 109.

In the conventional rotational angle sensor thus constructed, which is mounted on a vehicle for example, there is used a conversion mechanism (not shown) provided with a converter portion which converts a resistance force generated in a steering wheel (not shown) into a linear motion in proportion to a frictional force between vehicular wheels and a road surface at the time of operating the steering wheel. The portion located on the rotor 109 side with respect to the top plate 103a is positioned within a casing of the conversion mechanism, and a tip end portion 109a of the rotor 109 is brought into engagement with the converter portion. Further, the lead wire 115 is connected to a control circuit (not shown) which controls an electric motor (not shown) connected to the steering wheel, and a predetermined voltage is applied to both ends of the resistor pattern 112 through the lead wire 115 from the control circuit. The rotational angle sensor is used in this voltage-applied state.

When the vehicle driver operates the steering wheel, a resistance force is generated in the steering wheel, but this resistance force is converted to a linear motion by the foregoing converter portion, which causes the rotor 109 to rotate against the urging force of the coiled spring 117. With this rotation, the slider 107 slides on the resistor pattern 112 and current collector pattern 113, and voltage corresponding to the position of the slider 107 on the patterns 112 and 113 is outputted through the lead wire 115. In accordance with a detection signal of the resistance force thus obtained the aforesaid control circuit controls the operation of the electric motor so as to decrease the resistance force. It follows that an auxiliary steering torque has been imparted to the steering wheel. Consequently, the resistance force decreases and it is possible to lighten the vehicle driver's burden in operating the steering wheel.

When the steering wheel has been rotated approximately four times throughout the whole of its movable range, the foregoing stopper mechanism (not shown) functions to stop rotation of the rotor 109, thereby preventing the slider 107 from protruding from an end portion of the resistor pattern 112.

When the steering wheel is operated reverse to its neutral position from its four times rotated state, the coiled spring 117, by virtue of its urging force, causes the rotor 109 to follow the motion of the foregoing converter portion, thereby preventing the occurrence of a difference (so-called hysteresis) in the aforesaid detection signal between forward and reverse rotations of the steering wheel.

In the above conventional rotational angle sensor, the coiled spring 117 is compressed during rotation of the rotor 109 and imparts an urging force to the rotor 109. In this case, with rotation of the rotor 109, the coiled spring 117 is deformed axially (in arrow A directions) of the rotary shaft 106 or radially (in arrow D directions) of the coiled spring 117 and becomes off-centered, thus causing variations in the acting direction of the urging force of the coiled spring 117 exerted on the rotor 109. Consequently, the rotor 109 cannot stably follow the motion of the foregoing converter portion, thus giving rise to a fear that the resistance force developed in the steering wheel may not be detected accurately.

Moreover, vehicular electric devices are required to be highly dust-proof, and also in the above conventional rotational angle sensor the interior of the housing 101 is sealed by both O-ring 105 and insulating adhesive 116, which seal is somewhat effective in preventing the entry of dust. However, since the O-ring 105 is deteriorated by its sliding contact with the rotary shaft 106, it is difficult to keep the interior of the housing 101 dust-proof over a long term, and thus the aforesaid seal has been unsatisfactory as a dust-proofing measure. Further, handling of the insulating adhesive 116 is troublesome and requires a long drying time. Thus, the sealing work is poor in efficiency and troublesome.

SUMMARY OF THE INVENTION

The present invention has been accomplished in view of the above-mentioned circumstances of the prior art and it is an object of the invention to provide a rotational angle sensor which permits quick connection between a lead wire and a terminal and also permits reduction in axial size of a rotary shaft.

It is another object of the present invention to provide a rotational angle sensor capable of preventing off-centering of a coiled spring with rotation of a rotor and ensuring dust-proofing over a long term.

According to the present invention, for achieving the above-mentioned objects, there is provided a rotational angle sensor comprising a cylindrical housing formed of an insulating material, the housing having a receptacle portion with an opening formed therein; a rotary shaft supported rotatably by the housing; a rotational quantity detecting means for detecting a rotational quantity of the rotary shaft, the rotational quantity detecting means having a plurality of terminals and received in the receptacle portion; and lead wires for leading out detection signals to the exterior of the housing which detection signals are outputted from the rotation quantity detecting means through the terminals, wherein a lead wire inserting portion is projected integrally from an outer wall of the housing, holes for communication between the receptacle portion and the lead wire inserting portion are formed in the portion of the housing where the lead wire inserting portion is positioned, the terminals are brought into abutment against an inner wall of the receptacle portion and are opposed to the holes, one end portions of the lead wires inserted into the lead wire inserting portion are positioned within the receptacle portion through the holes formed in the housing, and the terminals and the one end portions of the lead wires are connected together in the vicinity of the above opening.

In the above configuration, the rotational quantity detecting means comprises a rotary member supported on the rotary shaft and received in the receptacle portion, a slider supported by the rotary member, and a circuit board supported within the receptacle portion and formed with resistor and current collector patterns with which the slider is in contact, the plural terminals are supported on the circuit board, the circuit board being disposed perpendicularly to the axis of the rotary shaft, and the rotary member, the slider and the circuit board being arranged successively in this order from the above opening toward an inner part of the receptacle portion.

In the above configuration, each of the plural terminals comprises a base portion extending perpendicularly to the axis of the rotary shaft and a connecting portion formed axially of the rotary shaft by bending one end of the terminal base portion, the connecting portions of the plural terminals being brought into abutment against the inner wall of the receptacle portion and are opposed to the holes formed in the housing, the connecting portions and one end portions of the lead wires being connected to each other, and an insulating wall is formed on the inner wall of the receptacle portion between adjacent connecting portions of the terminals.

In the above configuration, the connecting portions of the terminals and the one end portions of the lead wires are connected together in a space range which the rotary member, the slider and the circuit board occupy axially of the rotary shaft within the receptacle portion.

In the above configuration, the rotational angle sensor further includes a packing placed on an annular stepped portion formed in the inner wall of the receptacle portion, a cover which abuts the packing to close the opening of the receptacle portion, and a sealing member having elasticity and functioning to seal the holes with the lead wires passing therethrough, a peripheral edge portion of the opening of the receptacle portion is crushed to form a crushed portion in the housing, the cover being held grippingly by both the crushed portion and the annular stepped portion, thereby compressing the packing, and the sealing member being press-fitted into the lead wire inserting portion to seal the receptacle portion.

Further, according to the present invention there is provided a rotational angle sensor comprising a cylindrical housing; a partition wall formed within the housing; a receptacle portion defined by the partition wall within the housing and having an opening; an accommodating portion having an open portion and formed within the housing so as to be opposed to the receptacle portion through the partition wall; a rotary shaft supported rotatably by the housing through a hole formed in the partition wall; a rotational quantity detecting means received in the receptacle portion to detect a rotational quantity of the rotary shaft; a coiled spring accommodated in the accommodating portion and engaged at one end portion thereof with the housing; and a rotor formed with a pair of retaining portions, wherein a pair of stopper portions are provided in the housing along a peripheral edge of the open portion of the accommodating portion, an opposite end portion of the coiled spring is engaged with the rotor which is fixed onto the rotary shaft so as to close the open portion of the accommodating portion, one of the paired retaining portions is brought into abutment against one of the paired stopper portions by an urging force of the coiled spring, while the other retaining portion is made capable of abutting the other stopper portion, to constitute a stopper mechanism.

In the above configuration, the partition wall is formed with an annular portion within the accommodating portion, a first space is formed between the outside of the annular portion and the housing and a second space is formed inside the annular portion, the coiled spring is accommodated in the first space so that the one end portion of the coiled spring is engaged with the housing, and a sealing member is accommodated in the second space to seal the hole formed in the partition wall.

In above configuration, the rotational angle sensor further includes a packing placed on an annular stepped portion formed in an inner wall of the receptacle portion and a cover which abuts the packing to close the opening of the receptacle portion, a peripheral edge portion of the opening of the receptacle portion is crushed to form a crushed portion in the housing, the cover being held grippingly by both the crushed portion and the annular stepped portion, thereby compressing the packing, and the sealing member is accommodated in the second space to close the hole formed in the partition wall and seal the receptacle portion.

DETAILED DESCRIPTION OF THE PREFERRED EMBODIMENT

Figure 1:
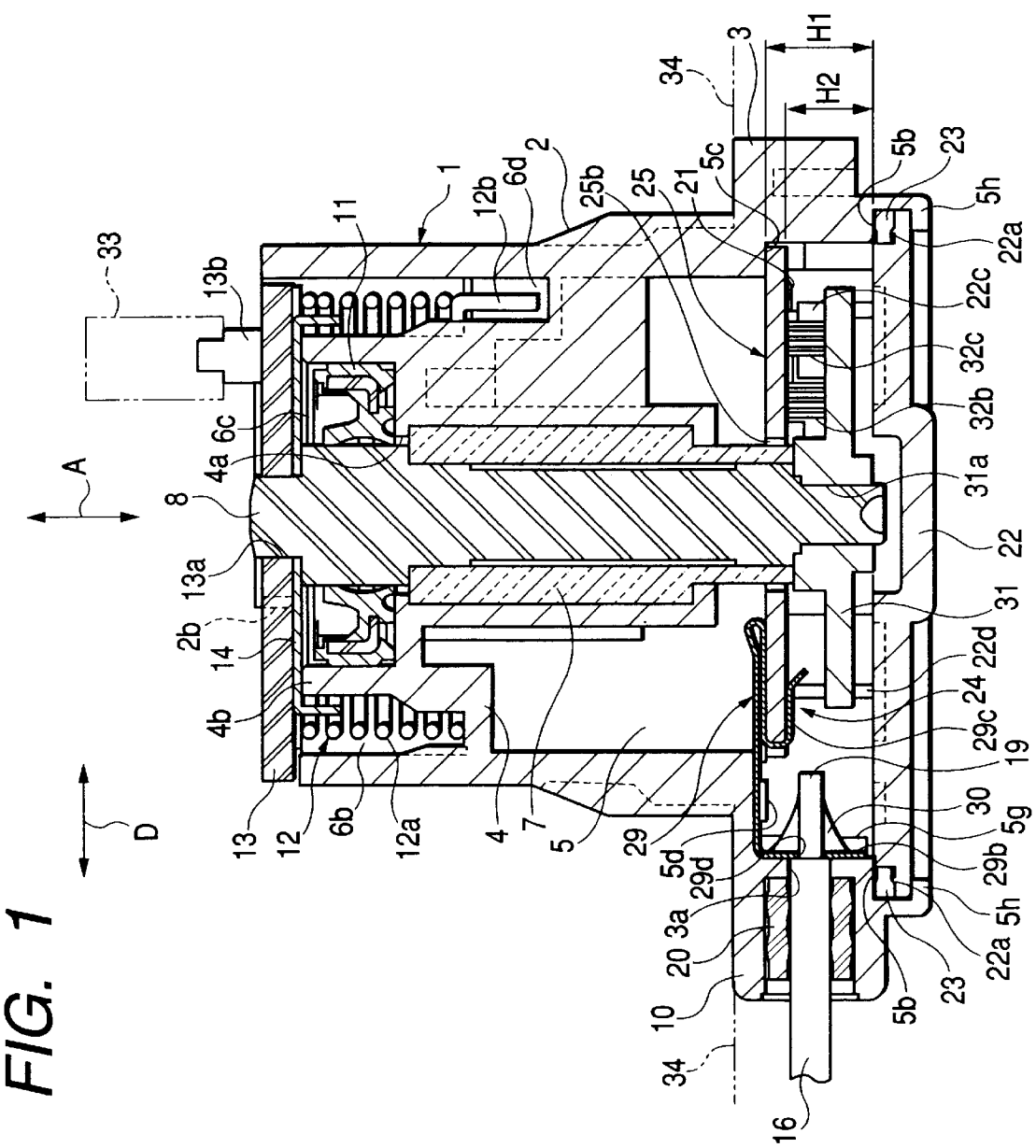
FIG. 1 is a sectional view of a rotational angle sensor embodying the present invention.

A rotational angle sensor according to an embodiment of the present invention will be described hereinunder with reference to FIGS. 1 to 20.

The rotational angle sensor of this embodiment is mainly composed of a housing 1 formed of an insulating synthetic resin such as PBT (polybutylene terephthalate), a rotary shaft 8 supported rotatably by the housing 1, a sealing member 11 through which the rotary shaft 8 is inserted, a rotor 13 fixed onto the rotary shaft 8, a coiled spring 12 for urging the rotor 13, a rotational quantity detecting means 24 received in a receptacle portion 5 of the housing 1 to detect a rotational quantity of the rotary shaft 8, lead wires 15 to 18 for leading out detection signals outputted from the rotational quantity detecting means 24 to the exterior of the housing 1, a plate spring 21 which holds a circuit board 25 of the rotary quantity detecting means 24 within the receptacle portion 5 of the housing 1, and a cover 22 for closing an opening 5a formed in the receptacle portion 5 of the housing 1.

The housing 1 comprises a cylindrical small-diameter portion 2 and a cylindrical large-diameter portion 3, the cylindrical portions 2 and 3 having hollow interiors and being integral with each other in a stepped form. As shown in FIGS. 4 to 7, the interior of the cylindrical small-diameter portion 2 is partitioned by a partition wall 4 into the receptacle portion 5 located on the large-diameter portion 3 and an accommodating portion 6 opposed to the receptacle portion 5 through the partition wall 4. The receptacle portion 5 is formed with the opening 5a on the side opposite to the partition wall 4, and the accommodating portion 6 is formed with an open portion 6a on the side opposite to the partition wall 4.

A hole 4a is formed centrally of the partition wall 4, and a metallic bearing 7 is fitted in the hole 4a by insert molding so as to extent into the receptacle portion 5. As shown in FIG. 1, a rotary shaft 8 made of stainless steel is inserted through the hole 4a and is carried on the bearing 7 rotatably. In the interior of the accommodating portion 6 the partition wall 4 is formed with an annular portion 4b so as to surround the bearing 7. A first space 6b is formed between the outside of the annular portion 4b and the small-diameter portion 2 and a second space 6c is formed inside the annular portion 4b. An engaging hole 6d is formed in the first space 6b.

A pair of mounting portions 9 each having an arcuate mounting hole 9a, as well as a cylindrical lead wire inserting portion 10, are projected from an outer wall of the large-diameter portion 3. Within the lead wire inserting portion 10, four holes 3a are formed in the large-diameter portion 3, providing communication between the interior of the lead wire inserting portion 10 and the interior of the receptacle portion 5. On an inner wall of the receptacle portion 5 is formed an annular stepped portion 5b having an annular chevron-shaped projection along a peripheral edge of the opening 5a. Inside the annular stepped portion 5b is formed a receiving surface 5c for receiving the circuit board 25 which will be described later. The receiving surface 5c is formed with a pair of engaging lugs 5e for engagement with the circuit board 25, a rectangular hole 5f into which the plate spring 21 is inserted, and five lugs 5d formed at equal intervals on a lower surface portion of the receiving surface 5c.

On the inner wall of the receptacle portion 5 and between the receiving surface 5c and the annular stepped portion 5b there are formed three square-shaped insulating walls 5g each positioned between adjacent holes 3a and opposed to the lugs 5d. In the large-diameter portion 3 is formed a crushed portion 5h by crushing the peripheral edge portion of the opening 5a inwards in accordance with a hot caulking method, as shown in FIG. 1. Further, in a peripheral edge of the open portion 6a the small-diameter portion 2 is partially cut out as a cut-out portion 2a, both ends of which are serve as a pair of stopper portions 2b and 2c.

The sealing member 11 is formed in a doughnut shape by embedding a thin metallic sheet into a rubber material. As shown in FIG. 1, the sealing member 11 is press-fitted into the second space 6c, with the rotary shaft 8 being inserted therethrough, as shown in FIG. 1. An inner peripheral surface of the sealing member 11 is in close contact with the rotary shaft 8 and closes the hole 4a formed in the partition wall 4.

The coiled spring 12 is formed by coiling a wire. As shown in FIG. 1, with the annular portion 4b positioned inside a coiled portion 12a of the coiled spring 12, the coiled spring is accommodated in the first space 6b and one end portion 12b thereof is engaged with the engaging hole 6d.

Figure 2:
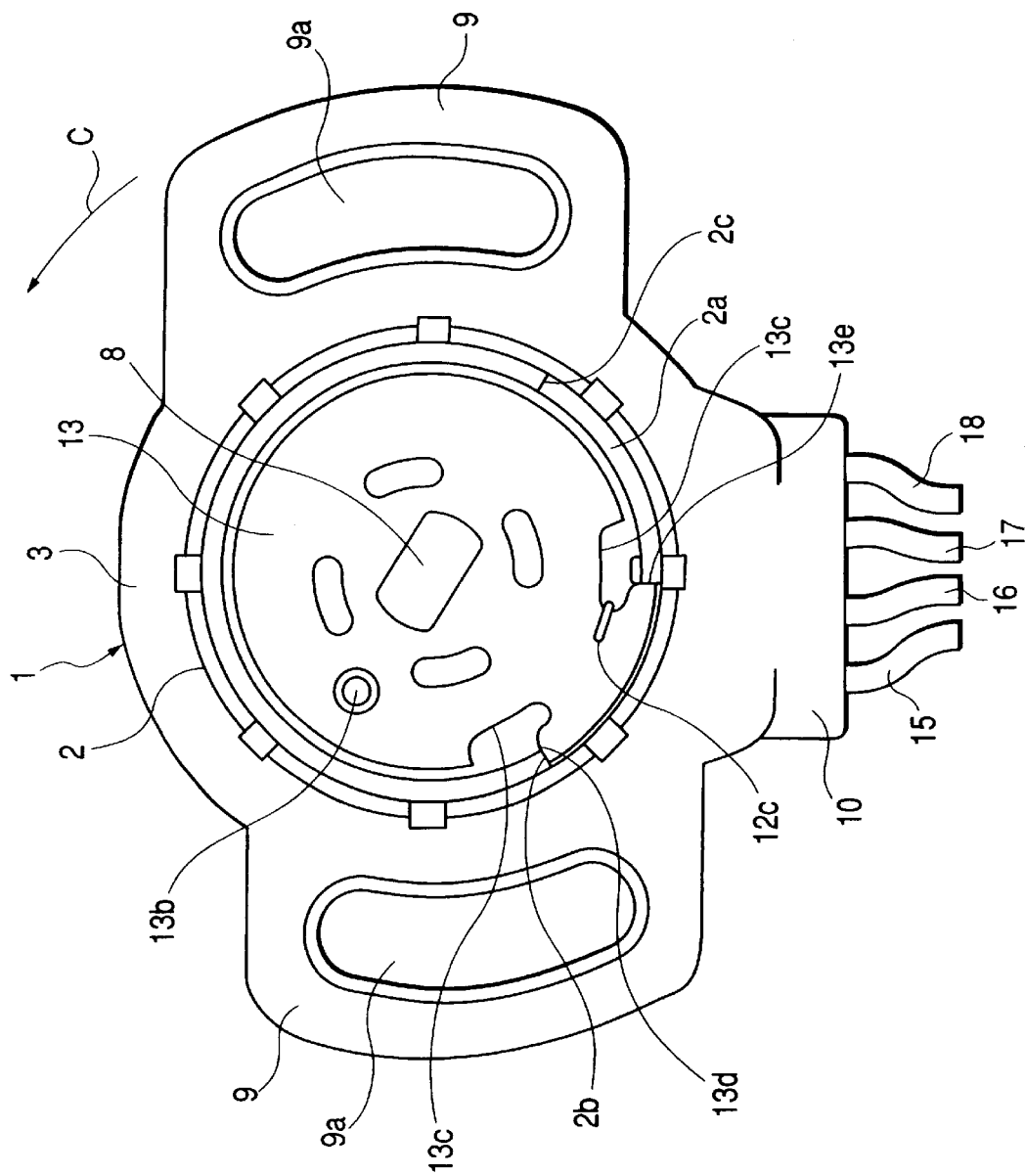
FIG. 2 is a plan view of the rotational angle sensor.
Figure 20:
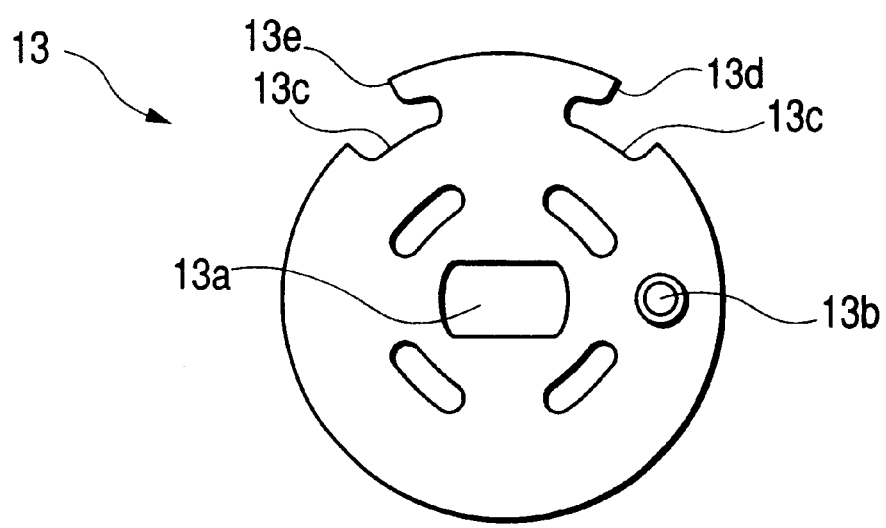
FIG. 20 is a plan view of a rotor used in the rotational range sensor.
Figure 21:
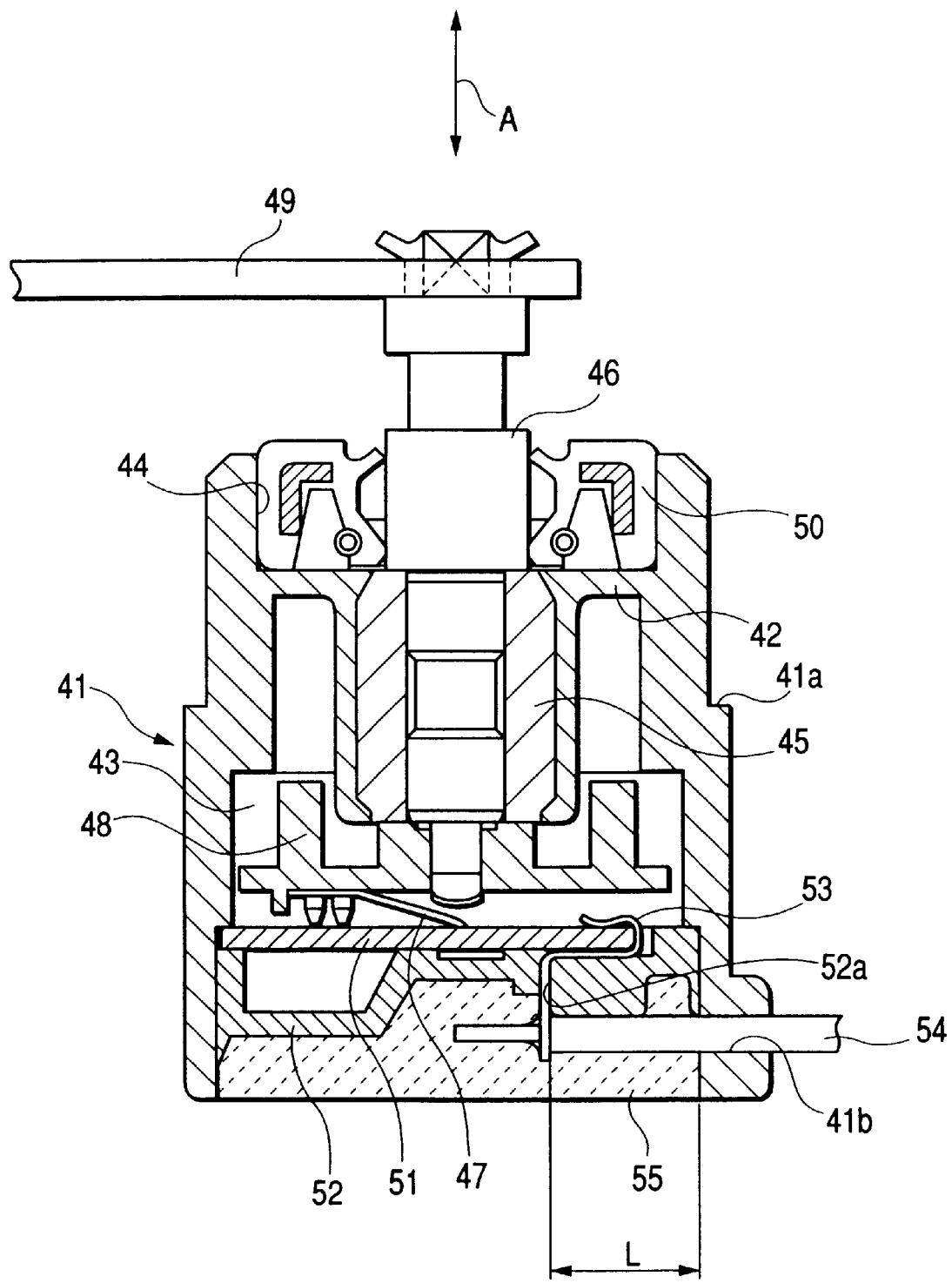
FIG. 21 is a sectional view of a conventional rotational angle sensor.
Figure 22:
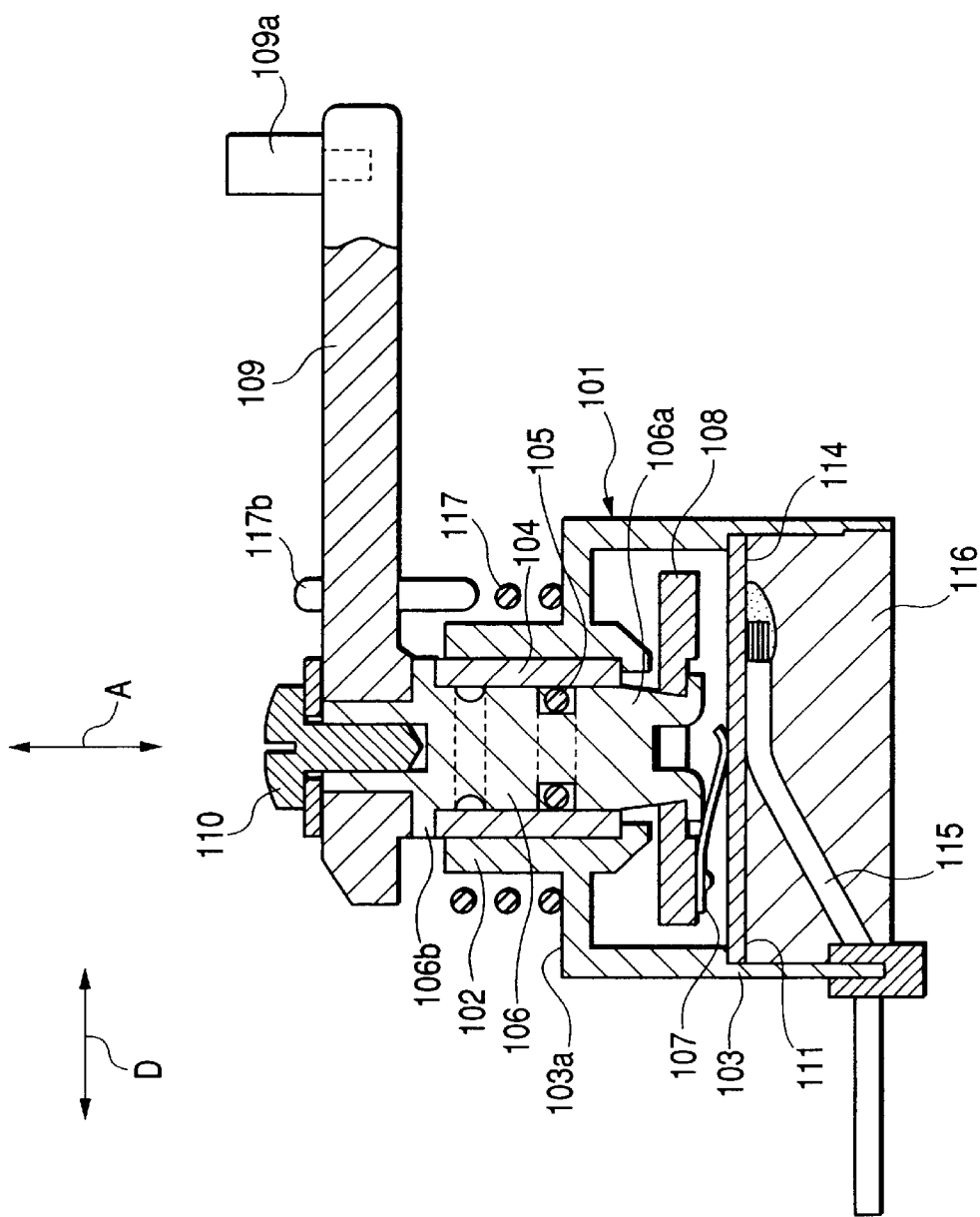
FIG. 22 is a sectional view of another conventional rotational angle sensor.
Figure 23:
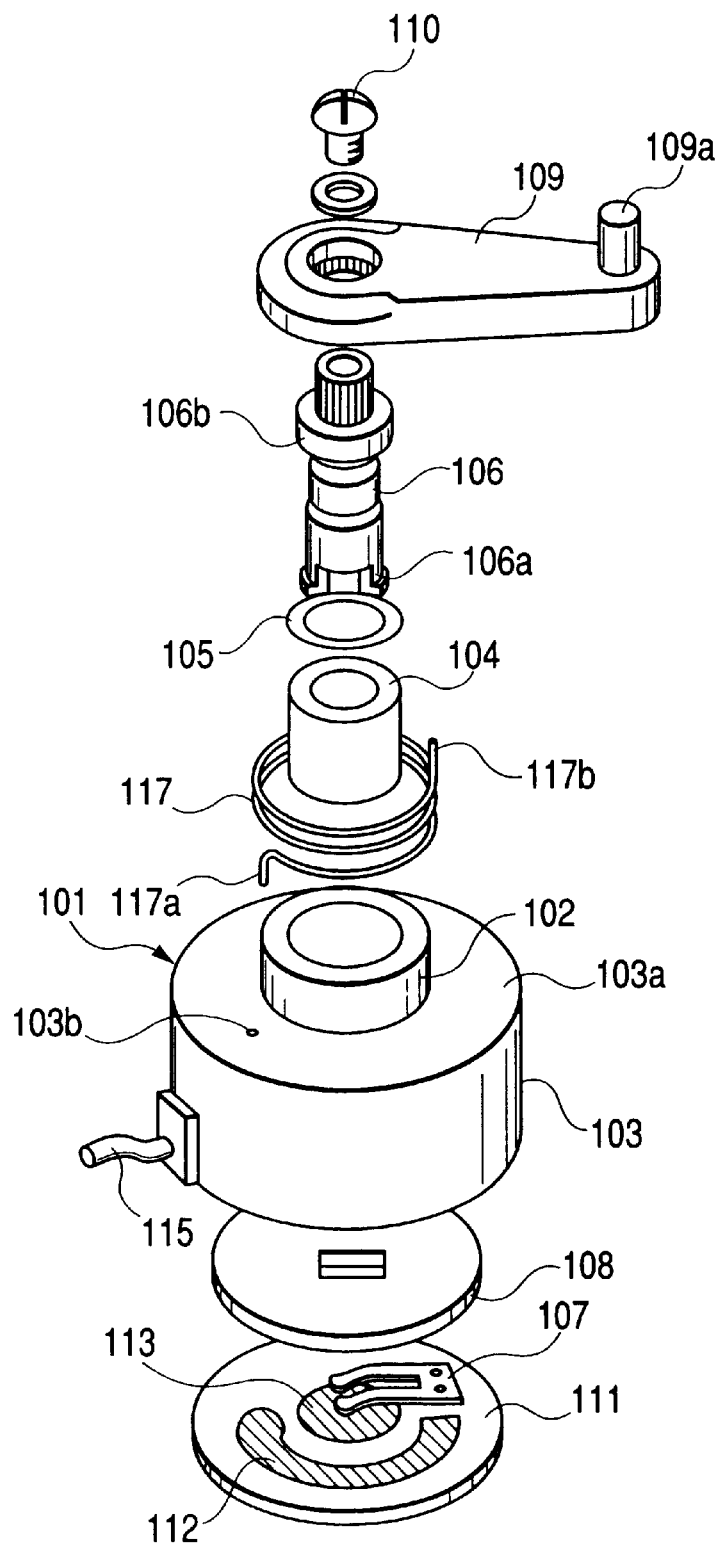
FIG. 23 is an exploded perspective view of the conventional rotational angle sensor.

The rotor 13 is formed in a disc shape from a flat steel plate. As shown in FIG. 20, an oval-shaped mounting hole 13a is formed centrally of the rotor 13, and an engaging pin 13b is fixed at a position spaced radially from the mounting hole 13a. Cut-out portions 13c are formed in two peripheral edge positions to afford a pair of retaining portions 13d and 13e. As shown in FIGS. 1 and 2, one end portion of the rotary shaft 8 inserted through the mounting hole 13a is caulked to the rotor 13 and the rotor is fixed to the rotary shaft 8 through a metallic disc 14 while closing the open portion 6a. An opposite end portion 12c of the coiled spring 12 is engaged with a cut-but portion 13c, and the retaining portion 13d is brought into abutment against the stopper portion 2b by an urging force of the coiled spring 12, while the retaining portion 13e is opposed to the stopper portion 2c at a predetermined spacing so that it can abut the stopper portion, thus constituting a stopper mechanism which restricts a rotational angle range of the rotary shaft 8.

As shown in FIGS. 1 and 2, lead wires 15 to 18 are each constituted by coating a conductor 19 with an insulating material except both end portions of the conductive wire. One end side of the conductor 19 is inserted integrally into a sealing member 20 which is formed in a rectangular shape using an elastic material such as rubber. The lead wires 15 to 18 are inserted on one end sides thereof into the lead inserting portion 10 of the housing 1 so that the conductors 19 extend through the holes 3a and are positioned within the receptacle portion 5. The sealing member 20 press-fitted into the lead wire inserting portion 10 is brought into close contact with an inner surface of the lead wire inserting portion 10 by virtue of an elastic force thereof to close the holes 3a.

Figure 12:
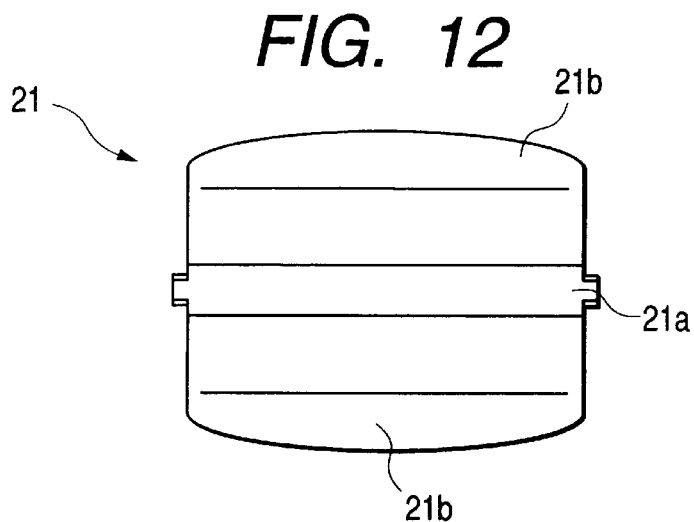
FIG. 12 is a plan view of a plate spring used in the rotational angle sensor.
Figure 13:
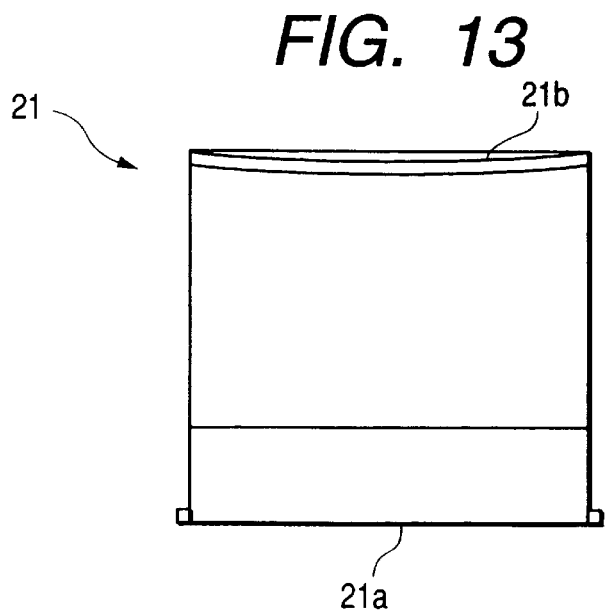
FIG. 13 is a front view of the plate spring.
Figure 14:
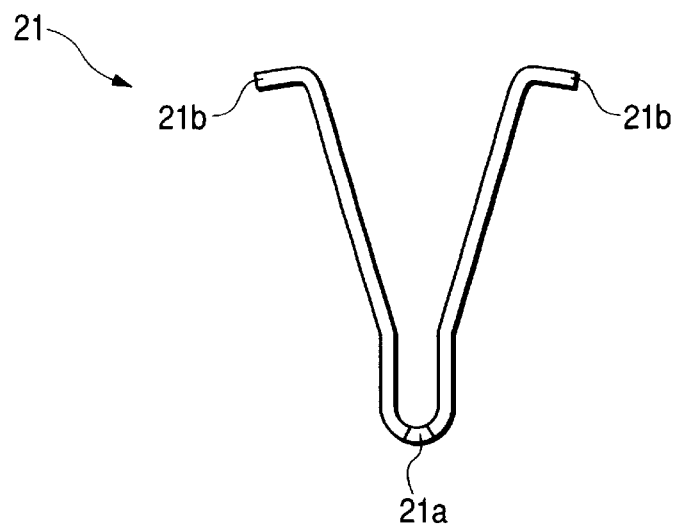
FIG. 14 is a side view of the plate spring.

As shown in FIGS. 12 to 14, the plate spring 21 is in V shape by bending a central part 21a of a thin, rectangular stainless steel sheet, with bent portions 21b being formed at both ends. The plate spring 21 is used as an urging member to urge the circuit board 25 which will be described later. The plate spring 21 is inserted at its central part 21a into the rectangular hole 5f formed in the housing 1 and is received within the receptacle portion 5.

Figure 15:
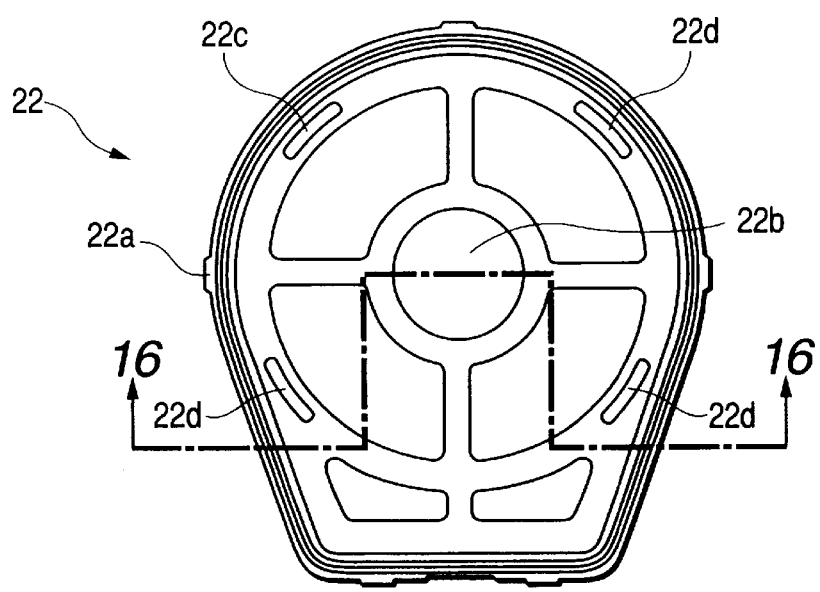
FIG. 15 is a plan view of a cover used in the rotational angle sensor.
Figure 16:
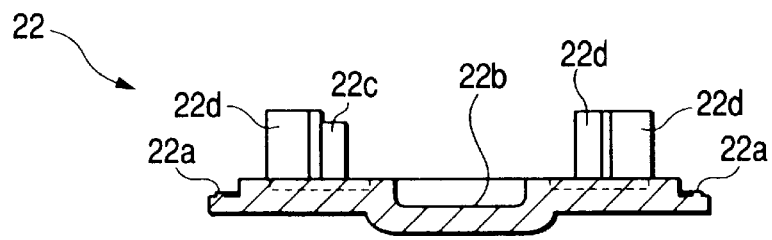
FIG. 16 is a sectional view taken along line 16—16 in FIG. 15.
Figure 17:
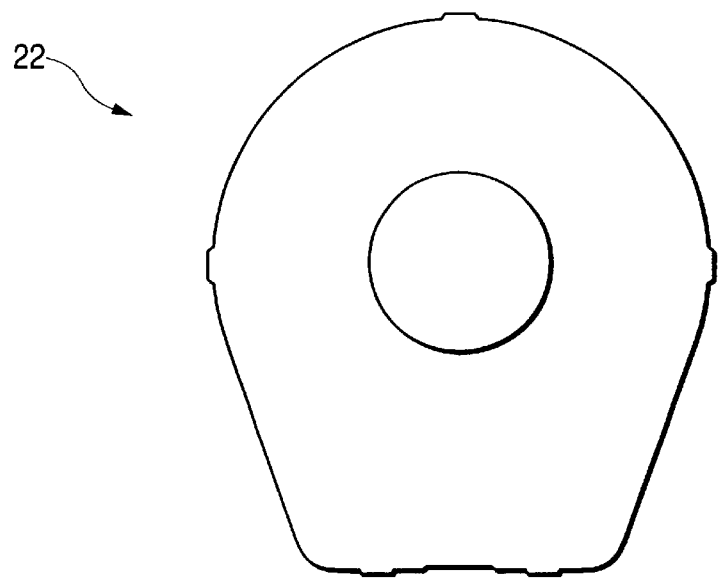
FIG. 17 is a bottom view of the cover used in the rotational angle sensor.

The cover 22 is formed like a flat plate using an insulating synthetic resin material such as PBT (polybutylene terephthalate). As shown in FIGS. 15 to 17, throughout the whole circumference of an edge portion of the cover 22 there is formed a stepped portion 22a having a chevron-shaped projection. Centrally of the cover 22 is formed a circular recess 22b, and a holding lug 22c and three restricting lugs 22d are formed upright concentrically between the stepped portion 22a and the recess 22b. As shown in FIG. 1, the stepped portion 22a of the cover 22 is brought into abutment against a ring-like packing 23 which is placed on the annular stepped portion 5b of the housing 1, to close the opening 5a while being positioned within the receptacle portion 5 and is caulked by the crushed portion 5h. The packing 23 is compressed by the chevron-shaped projections of the stepped portion 22a and the annular stepped portion 5b opposed to each other. In this state the cover 22 is fixed to the housing 1. Thus, in cooperation with the sealing members 11 and 20 the cover 22 seals the interior of the receptacle portion 5 hermetically. Further, the holding lug 22c and the restricting lugs 22d are formed so as to extend axially (in arrow A directions in FIG. 1) of the rotary shaft 8 within the receptacle portion 5, and the holding lug 22c, indicated with a dotted line in FIG. 3, is in abutment against the bent portions 21b of the plate spring 21 to hold the plate spring within the receptacle portion 5 so as not to fall off from the rectangular hole 5f.

The rotational quantity detecting means 24 is made up of the circuit board 25 which is supported within the receptacle portion 5 of the housing 1, a rotary member 31 supported on the rotary shaft 8 and received in the receptacle portion 5, four terminals 29 supported by the circuit board 25, and two sliders 32 supported by the rotary member 31.

Figure 8:
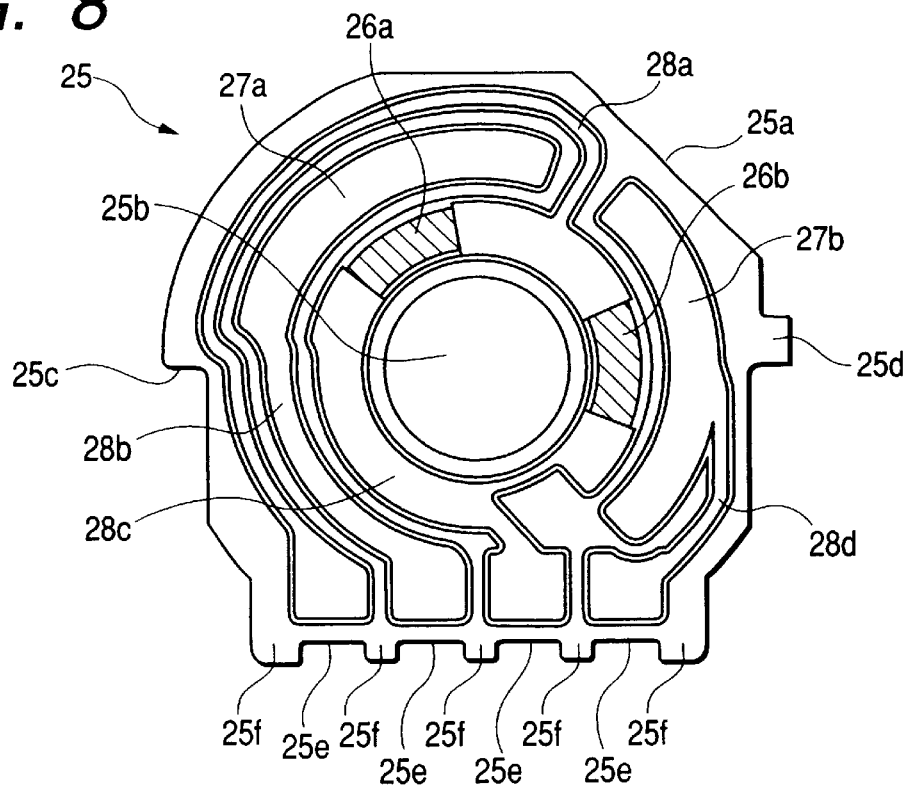
FIG. 8 is a plan view of a circuit board used in the rotational angle sensor.

The circuit board 25 is formed by molding an insulating material such as a ceramic material into a square shape. As shown in FIG. 8, one corner of the circuit board 25 is cut off to form a tapered portion 25a, and a circular insertion hole 25b is formed centrally of the circuit board. On one side of the circuit board 25 is formed a cut-out portion 25c, while on an opposite side thereof is provided a projecting piece 25d integrally. At the edge of one end of the circuit board 25 are formed cut-out portions 25e at equal intervals, thereby forming five projecting portions 25f. On the surface of the circuit board 25 are formed resistor patterns 26a, 26b and current collector patterns 27a, 27b by printing concentrically with the insertion hole 25b. Further, conductive patterns 28a to 28d are contiguous to the resistor patterns 26a, 26b and current collector patterns 27a, 27b and are extended up to the edge portion of one end of the circuit board 25, at which portion the conductive patterns are opposed to the cut-out portions 25e.

Figure 3:
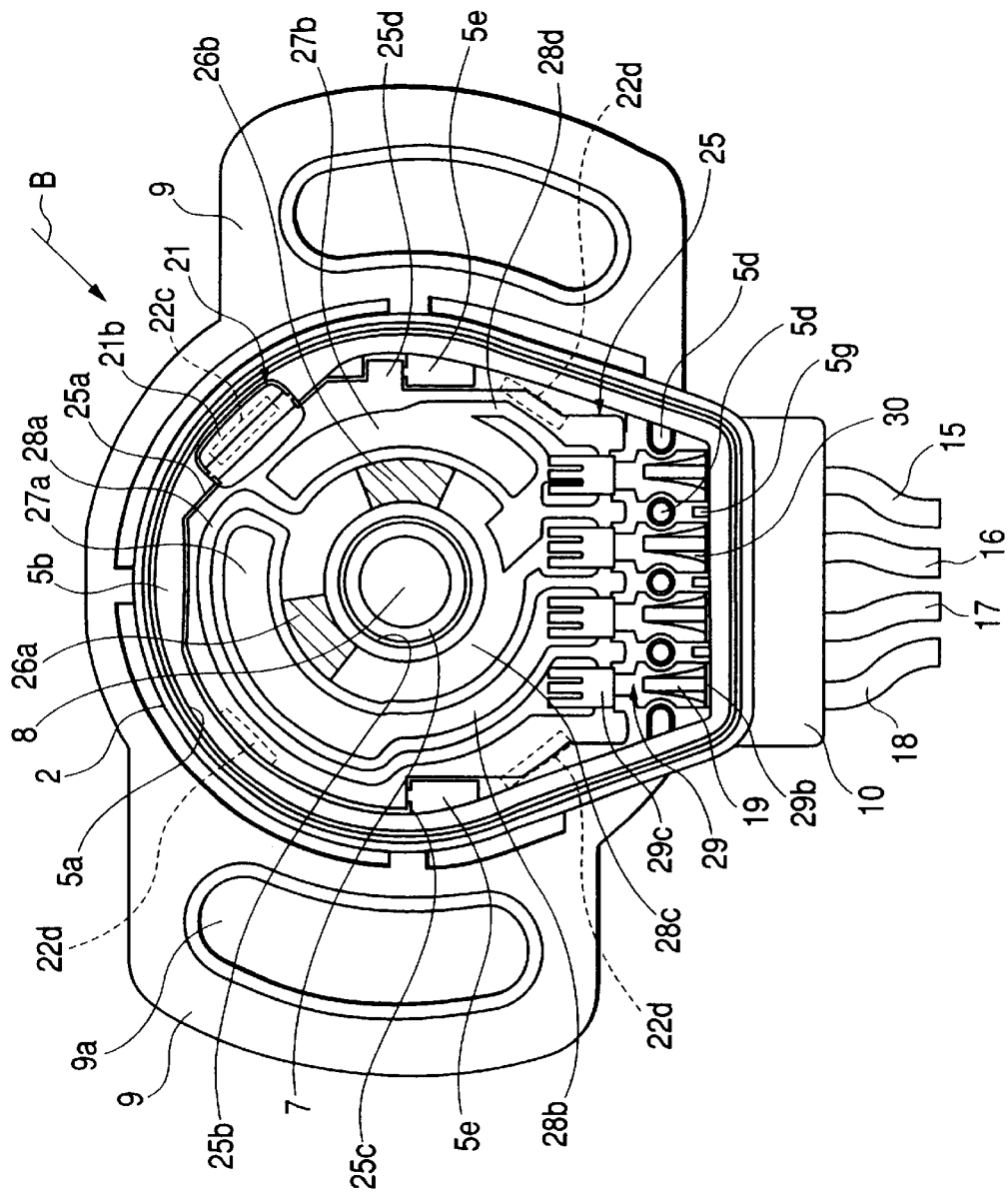
FIG. 3 is a bottom view of the rotational angle sensor with a cover removed.
Figure 4:
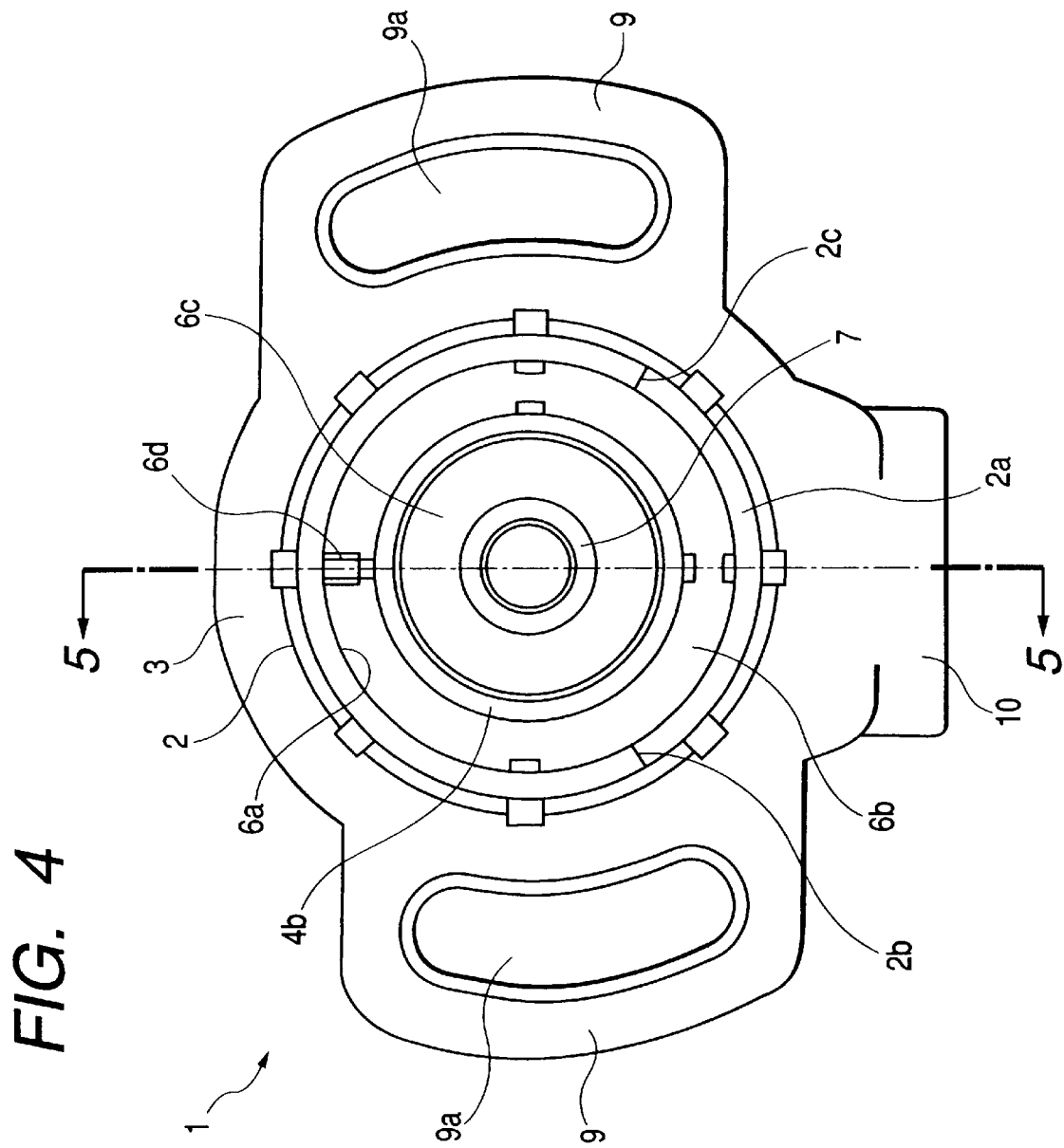
FIG. 4 is a plan view of a housing used in the rotational angle sensor.
Figure 5:
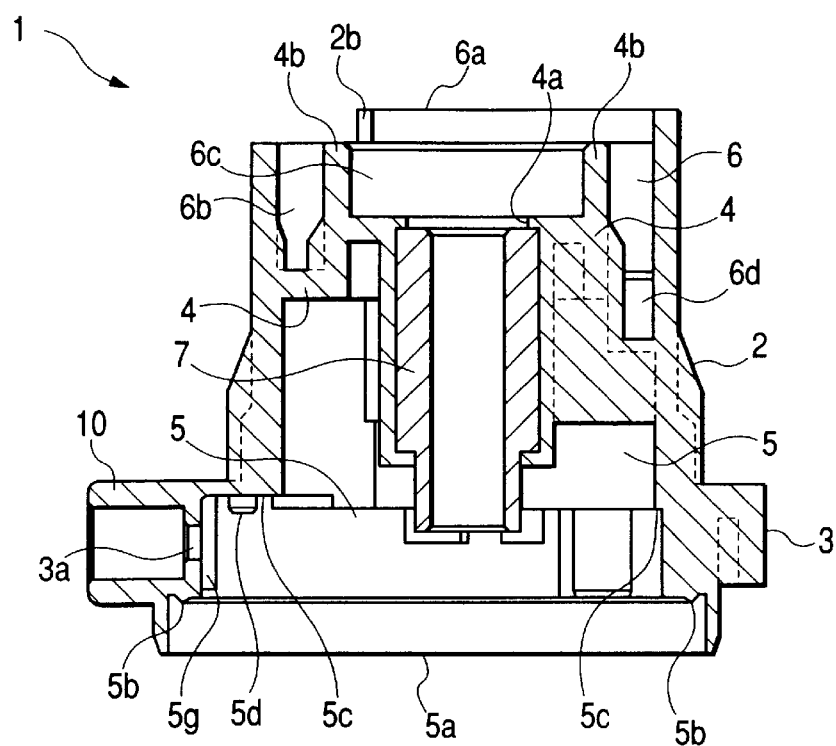
FIG. 5 is a sectional view taken along line 5—5 in FIG. 4.
Figure 6:
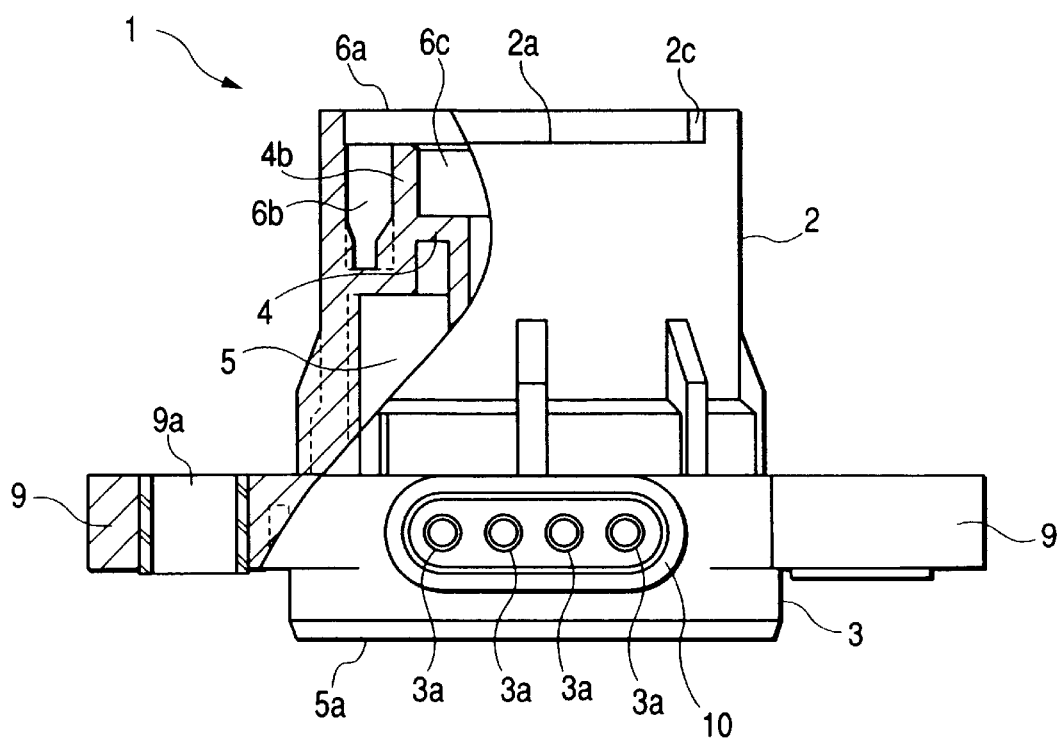
FIG. 6 is a partially cut-away front view of the housing.
Figure 7:
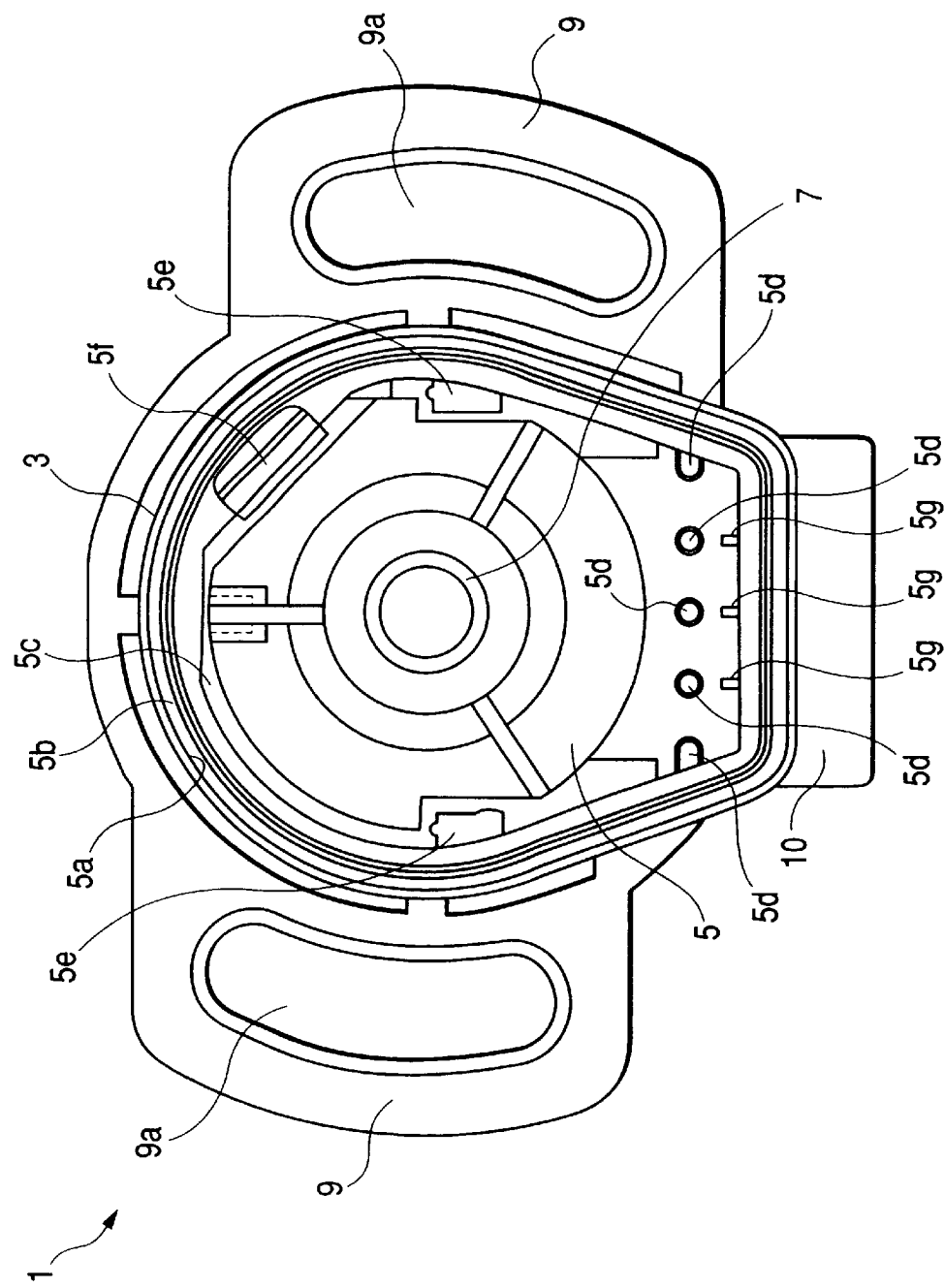
FIG. 7 is a bottom view of the housing.

As shown in FIGS. 1 and 3, the back of the circuit board 25 is in abutment with the receiving surface 5c of the housing 1, the rotary shaft 8 and the bearing 7 are inserted into the insertion hole 25b, and the tapered portion 25a is pressed in arrow B direction by the plate spring 21, whereby the cut-out portion 25c and the projecting piece 25d are brought into elastic contact with projecting portions formed on two side faces of the left-hand engaging lug 5e and also with a projecting portion formed on one side face of the right-hand lug 5e in the same figure. In this state the circuit board 25 is positioned and supported within the receptacle portion 5. The three restricting lugs 22d indicated with dotted lines in FIG. 3 are opposed to the surface of the circuit board 25 through a clearance of several ten microns or so to restrict the movement of the circuit board axially (in arrow A directions) of the rotary shaft 8 in the receptacle portion 5 (the resistor patterns 26a and 26b in FIGS. 3 and 8 are represented by oblique lines).

Figure 9:
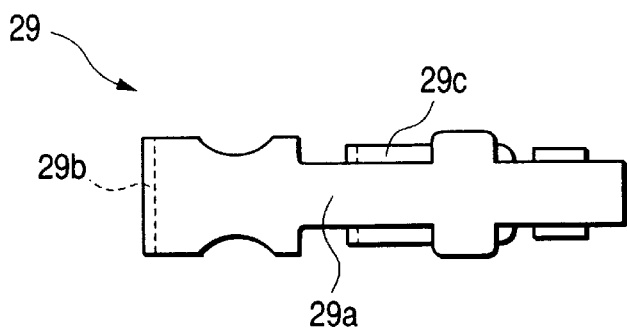
FIG. 9 is a plan view of a terminal used in the rotational angle sensor.
Figure 10:
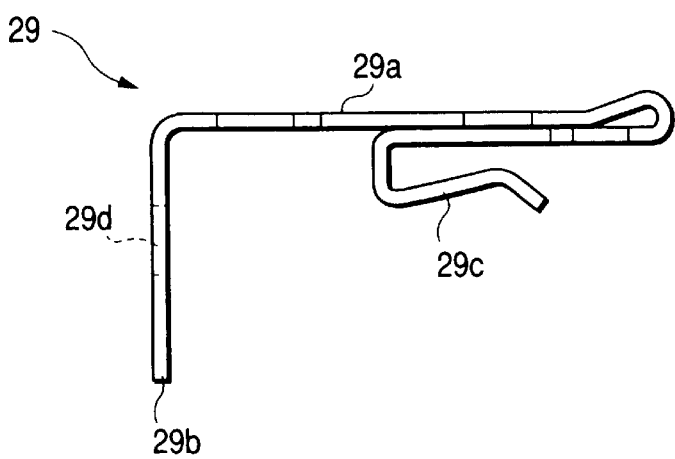
FIG. 10 is a side view of the terminal.
Figure 11:
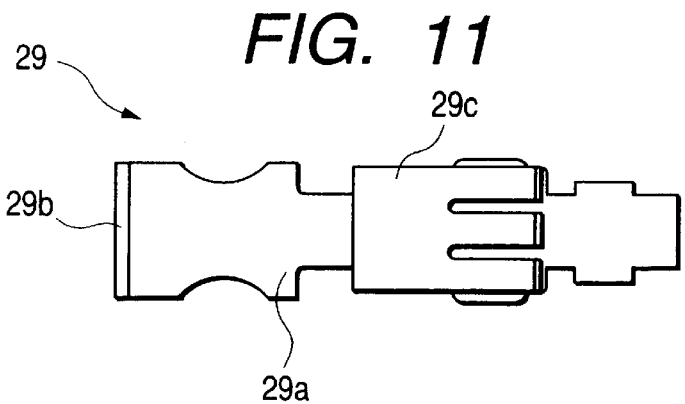
FIG. 11 is a bottom view of the terminal.

The four terminals 29 are of the same configuration and, as shown in FIGS. 9 to 11, they each comprise an elongated base portion 29a constituted by an electrically conductive thin plate, a connecting portion 29b bent at right angles from one end of the base portion 29a, and a clip portion 29c bent in U shape from an opposite end of the base portion 29a, with a hole 29d being formed in the connecting portion 29b. The clip portions 29c of the four terminals 29 grip an edge portion at one end of the circuit board 25 into conduction with the conductive patterns 28a to 28d. In this way the terminals 29 are supported on the circuit board 25 and are received in the receptacle portion 5 together with the circuit board 25. Their base portions 29a are each positioned between adjacent lugs 5d, their connecting portions 29b are in abutment against the inner wall of the receptacle portion 5, the holes 29d formed in the connecting portions 29b are opposed to the holes 3a formed in the housing 1, one end portions of the conductors 19 of the lead wires 15 to 18 inserted into the holes 29d are connected to the connecting portions 29b by solder 30 in the vicinity of the opening 5a, and the insulating walls 5g are each positioned between adjacent connecting portions 29b.

Figure 18:
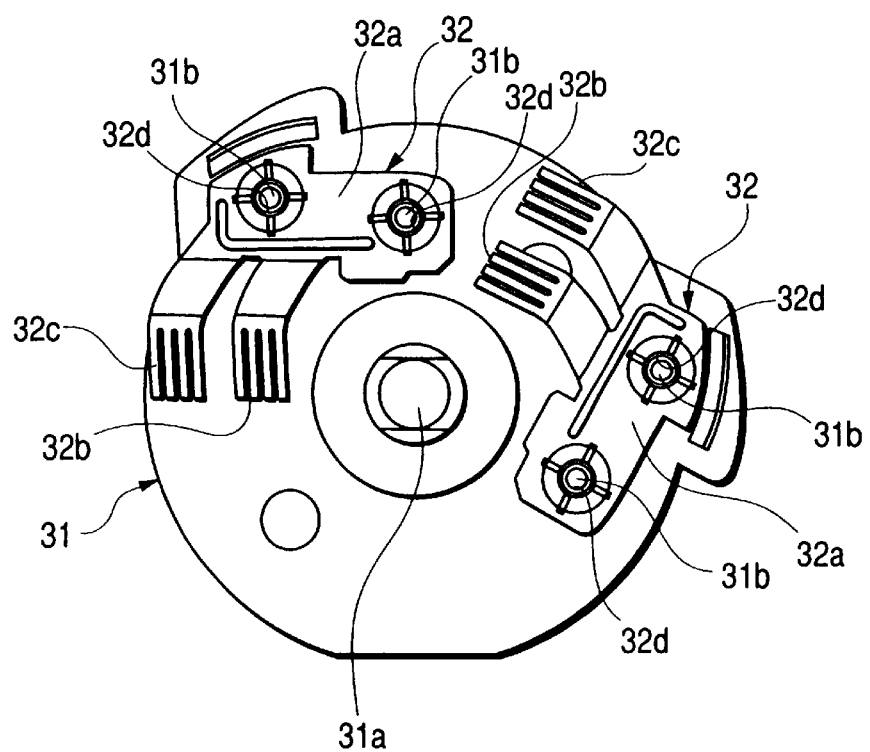
FIG. 18 is a plan view of a rotary member used in the rotational angle sensor.

The rotary member 31 is formed in the shape of a disc using an insulating synthetic resin material such as PBT (polybutylene terephthalate) and, as shown in FIG. 18, an axial hole 31a is formed centrally of the rotary member 31, with projections 31b being formed around the axial hole 31a. As shown in FIG. 1, the opposite end portion of the rotary shaft 8 inserted through the axial hole 31a is caulked to the rotary member 31, whereby the rotary member is fixed to the shaft 8 and is accommodated within the receptacle portion 5 so as to be opposed to the circuit board 25 at a predetermined spacing.

Figure 19:
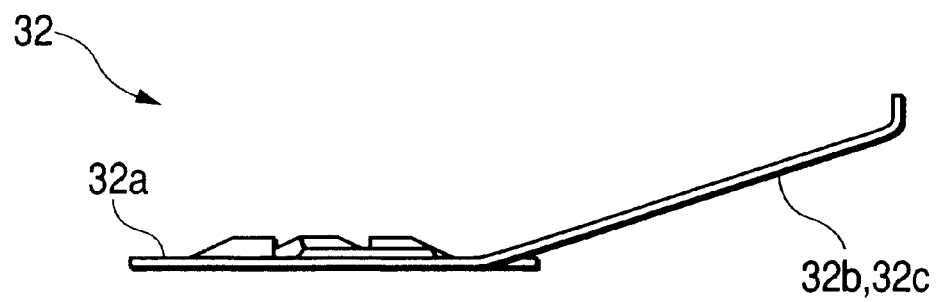
FIG. 19 is a side view of a slider used in the rotational angle sensor.

The two sliders 32, which are of the same configuration, are formed by cutting and bending an electrically conductive thin plate such as a thin nickel silver or phosphor bronze plate. As shown in FIGS. 18 and 19, each slider 32 has amounting portion 32a and a pair of sliding pieces 32b and 32c extending from the mounting portion 32a, with mounting holes 32d being formed in the mounting portion 32a. By press-fitting the mounting holes 32d onto the projections 31b the two sliders 32 are supported on the rotary member 31 and are received within the receptacle portion 5 of the housing 1 together with the rotary member 31. The paired sliding pieces 32b and 32c of one slider 32 are brought into sliding contact respectively with the resistor pattern 26a and the current collector pattern 27a to render both patterns conductive with each other, while the paired sliding pieces 32b and 32c of the other slider 32 are brought into sliding contact respectively with the resistor pattern 26b and the current collector pattern 27b, to render both patterns conductive with each other.

The following description is now provided about how to assemble the rotational angle sensor constituted as above. First, the rotary shaft 8 is inserted into the bearing 7 mounted in the housing 1 and then the sealing member 11 is press-fitted into the second space 6c. Next, the metallic plate 14 is fitted on one end portion of the rotary shaft 8 and then the coiled spring 12 is received in the first space 6b with its one end portion 12b engaged with the engaging hole 6d. Then, the opposite end portion 12c of the coiled spring 12 is brought into engagement with a cut-out portion 13c and, while the coiled spring 12 is compressed, the rotor 13 with the engaging pin 13b fixed thereto is fitted on one end portion of the rotary shaft 8 through the mounting hole 13a and is fixed by caulking the one end portion of the rotary shaft.

Next, the rotary shaft 8 and the bearing 7 are inserted through the insertion hole 25b and the back of the circuit board 25 which supports the four terminals 29 is brought into abutment against the receiving surface 5c to accommodate the circuit board 25 in the receptacle portion 5. Then, the plate spring 21 is inserted from its central part 21a side into the rectangular hole 5f formed in the housing 1, allowing the plate spring 21 to push the tapered portion 25a of the circuit board 25, so that cut-out portion 25c and the projecting piece 25d are pushed respectively into engagement with the paired engaging lugs 5e. In this state the lugs 5d are melted by heating to caulk the base portions 29a of the four terminals 29 to the receiving surface 5c. Then, one end portions of the lead wires 15 to 18 which have been rendered integral with the sealing member 20 are press-fitted into the lead wire inserting portion 10 together with the sealing member. As a result, the sealing member 20 is guided by the inner surface of the lead wire inserting portion 10, the one end portions of the lead wires 15 to 18 are positioned within the holes 3a, and the conductors 19 extend respectively through the holes 29d formed in the connecting portions 29b of the four terminals 29. In this state the conductors 19 and the connecting portions 29b are connected together by solder 30. At this time, the insulating walls 5g each positioned between adjacent connecting portions 29b stop the flow of the solder 30 to prevent the adjacent connecting portions 29b from being connected together by the solder 30.

Next, the other end portion of the rotary shaft is inserted through the axial hole 31a, the rotary member 31 which supports the two sliders 32 is received in the receptacle portion 5, and the other end portion of the rotary shaft is caulked to fix the rotary member 31. Thereafter, the packing 23 is put on the annular stepped portion 5b and the cover 22 is accommodated into the receptacle portion 5 from the opening 5a, with the result that the stepped portion 22a comes into abutment against the packing 23 and the holding lug 22c, abuts the bent portions 21b of the plate spring 21. In this state the peripheral edge portion of the opening 5a is crushed inside by a hot caulking method to form the crushed portion 5h and the cover 22 is fixed to the housing 1 by caulking of the crushed portion 5h.

Assembly of the rotational angle sensor is thus completed. In the assembled state, as shown in FIG. 1, the circuit board 25 is perpendicular to the axis (arrow A directions) of the rotary shaft 8, the base portions 29a of the terminals 29 extend from the circuit board 25 perpendicularly to the axis of the rotary shaft, and the connecting portions 29b of the terminals 29 stand up in parallel with the axis of the rotary shaft 8. The rotary member 31, the sliders 32 and the circuit board 25 are arranged successively in this order from the opening 5a toward the inner part of the receptacle portion 5. In the range of a space H1 occupied by the rotary member 31, sliders 32 and circuit board 25 axially of the rotary shaft 8 in the receptacle portion 5, the connecting portions 29b of the four terminals 29 and one end portions of the conductors 19 of the lead wires 15 to 18 are respectively connected together by solder 30. This connected portion overlaps a space H2 which the restricting lugs 22d of the cover 22 occupy axially (arrow A directions) off the rotary shaft 8.

As shown in FIG. 2, the opposite end portion 12c of the coiled spring 12 is engaged with a cut-out portion 13c, the retaining portion 13d is abutted against the stopper portion 2b with the urging force of the coiled spring 12, and the retaining portion 13e and the stopper portion 2c are opposed to each other at a predetermined spacing. At this time, the paired sliding pieces 32b and 32c of one slider 32 are respectively brought into sliding contact with one end portion of the resistor pattern 26a and the current collector pattern 27a to render both patterns conductive with each other. Likewise, the paired sliding pieces 32b and 32c of the other slider 32 are respectively brought into sliding contact with one end portion of the resistor pattern 26b and the current collector pattern 27b to render both patterns conductive with each other.

The rotational angle sensor thus constituted and assembled according to the present invention is mounted on a vehicle for example. The small-diameter portion 2 is positioned within a casing 34 of a conversion mechanism with a converter portion 3 incorporated therein, the converter portion 3 functioning to convert a resistance force generated in the steering wheel into a linear motion in accordance with a frictional force between the vehicular wheels and a road surface at the time of operating the steering wheel (not shown). Further, the engaging pin 13 is brought into engagement with the converter portion 33, the lead wires 15 to 18 are connected to a control circuit (not shown) which controls an electric motor (not shown) connected to the steering wheel, female screws (not shown) are threadedly fitted into the mounting holes 29a of the paired mounting portions 9 to fix the housing 1 to the casing 34, and a predetermined voltage is applied between the conductive patterns 28a and 28c from the control circuit through the lead wires 16, 18 and the terminals 29. The rotational angle sensor is used in this voltage-applied state.

When the vehicle driver operates the steering wheel, a resistance force is generated in the steering wheel. The converter portion 33 converts this resistance force into a linear motion and causes the rotary shaft 8 to rotate (in arrow C direction in FIG. 2) through the rotor 13 against the urging force of the coiled spring 12. With this rotation, one slider 32 rotates and its paired sliding pieces 32b and 32c slide on the resistor pattern 26a and the current collector pattern 27a from one to the other end side, so that the conductive position between the resistor pattern 26a and the current collector pattern 27a based on one slider 32 changes and a rotational quantity of the rotary shaft 8 is detected. A voltage proportional to this rotational quantity of the rotary shaft 8 is outputted as a detection signal of the aforesaid resistance force through the associated terminal 29 and lead wire 17. In accordance with this detection signal the control circuit controls the operation of the electric motor so as to decrease the resistance force. It follows that an auxiliary steering torque has been imparted to the steering wheel. Consequently, the resistance force decreases and it is possible to lighten the burden on the vehicle driver at the time of operating the steering wheel.

Likewise, with rotation of the rotary shaft 8, the other slider 32 also rotates integrally with the rotary member 31 and its paired sliding pieces 32b and 32c slide on the resistor pattern 26b and the current collector pattern 27b from one to the other end side, so that a voltage corresponding to the conductive position of the other slider 32 on the patterns 26b and 27b is outputted as a monitor signal to the control circuit through the associated terminal and lead wire 15. Therefore, by making calculation and comparison using the above monitor signal and detection signal, the control circuit can always check the state of operation as to whether there is no trouble in the output of the rotational angle sensor.

When the steering wheel has been turned about four times throughout the whole movable range thereof, the foregoing stopper mechanism fulfills its function. To be more specific, the retaining portion 13e of the rotor 13 comes into abutment against the stopper portion 2c to stop the rotation of the rotary shaft 8, thereby stopping the sliding pieces 32b of the two sliders 32 at the opposite end portions of the resistor patterns 26a and 26b. Thus, protrusion of the sliding pieces 32b to the conductive patterns 28c and 28a is sure to be prevented. When the steering wheel is operated reverse for return to its neutral position from the four times rotated state, the coiled spring 12, with its urging force, causes the rotor 13 to follow the motion of the converter portion 33 to prevent the occurrence of a difference (so-called hysteresis) between the detection signal and the monitor signal when the rotor 13 rotates in arrow C direction and when it rotates in the direction opposite to arrow C. At this time, deformation of the coiled spring 12 relative to the axis of the rotary shaft 8 is prevented by the rotor 13, while deformation of the coiled spring 12 relative to the radial directions (arrow D directions in FIG. 1) is prevented by both small-diameter portion 2 and annular portion 4b.

Although in the above embodiment the holes 29d are formed in the connecting portions 29b of the terminals 29 for connection between the lead wires 15 to 18 and the terminals 29, the present invention is not limited thereto. Various modifications may be made. For example, the connecting portions 29b may be cut out partially and the cut-out portions thus formed may be used instead of the holes 29b.

The rotational angle range of the rotor 13 can be changed easily by merely changing the size of the cut-out portion 2a in the rotating direction (arrow C direction) of the rotor 13. Thus, it is possible to smoothly cope with a request for changing the rotational angle range of the rotor 13.

The present invention is practiced in the above mode of embodiment and exhibits the following effect.

Terminals are brought into abutment against the inner wall of the receptacle portion formed in the housing and are opposed to the holes through which lead wires are inserted, further, the terminals and one end portions of the lead wires are connected together near the opening of the housing, so by merely inserting the lead wires into the lead wire inserting portion and positioning their one end portions within receptacle portion in the housing, the lead wires are conducted to the terminals. Thus, the terminals-lead wires connecting work is extremely simplified and hence can be carried out quickly. Besides, since the terminals are connected with the lead wires in their abutted state against the inner wall of the receptacle portion, the lead wires-terminals connection can be protected sufficiently against pulling of the lead wires.

Since the rotary member, sliders and circuit board are arranged successively in this order from the above opening toward the receptacle portion, it is possible to realize the rotational quantity detecting means in a simple configuration.

The connecting portions of the terminals and one end portions of the lead wires are respectively connected together and an insulating wall is formed on the inner wall of the receptacle portion positioned between adjacent terminals, so when the connecting portions and one end portions of the lead wires are connected together by solder, the flow of the solder is stopped by the insulating wall and thus the adjacent connecting portions can be prevented from being interconnected by the solder.

Since the connecting portions of the terminals and one end portions of the lead wires are connected together within the receptacle portion and in the space range which the rotary member, the sliders and the circuit board occupy axially of the rotary shaft, the rotational angle sensor can be made so much compact in the axial direction of the rotary shaft.

Moreover, a packing is disposed between an annular stepped portion formed in the inner wall of the receptacle portion and a cover which closes the opening of the housing, a sealing member which closes the holes through which the lead wires are inserted, a peripheral edge portion of the opening of the housing is crushed to form a crushed portion, the cover is held grippingly by both the crushed portion and the annular stepped portion, causing the packing to be compressed, and the sealing member is press-fitted into the lead wire inserting portion to seal the receptacle portion, so it is possible to prevent entry of dust and moisture into the receptacle portion, prevent an abnormal output from the rotational quantity detecting means which is caused by the entry of such dust and moisture, and increase the service life of the rotational quantity detecting means. Additionally, since the receptacle portion can be sealed without using any insulating adhesive, it is possible to omit the time and labor required for the charging and drying of the insulating adhesive and hence possible to simplify the manufacturing process as a whole.

Further, a coiled spring is accommodated in the accommodating portion formed in the cylindrical housing, and a rotor having retaining portions for abutment against stopper portions formed at the peripheral edge of an open portion of the housing and which closes the open portion of the housing is fixed onto the rotary shaft, so deformation of the coiled spring relative to the axial direction of the rotary shaft is prevented by the rotor and deformation of the coiled spring relative to its radial direction can be prevented by the receptacle portion. Consequently, there is no fear that there may occur variations in the urging force acting direction of the coiled spring which force is applied to the rotor, thus affording a rotational angle sensor having a high detection accuracy.

Further, an annular portion is formed on the partition wall within the accommodating portion, first and second spaces are formed respectively between the outside of the annular portion and the housing and inside the annular portion, the coiled spring is accommodated in the first space, with one end portion of the coiled spring being engaged with the housing, and a sealing member is received in the second space to close the foregoing holes. Consequently, the holes are covered not only with the sealing member but also with all of the rotor, the housing and the annular portion, thus permitting the interior of the housing to be kept dustproof over a long period.

What is claimed is:
1. A rotational angle sensor comprising:

a cylindrical housing formed of an insulating material, the housing having a receptacle portion with an opening formed therein;

a rotary shaft supported rotatably by the housing;

a rotational quantity detecting mechanism to detect a rotational quantity of the rotary shaft, the rotational quantity detecting mechanism having a plurality of terminals and being received in the receptacle portion; and lead wires for leading out detection signals to the exterior of the housing which detection signals are outputted from the rotational quantity detecting mechanism through the terminals, wherein a lead wire inserting portion is projected integrally from an outer wall of the housing, holes for communication between the receptacle portion and the lead wire inserting portion are formed in a portion of the housing where the lead wire inserting portion is positioned, the terminals are brought into abutment against an inner wall of the receptacle portion and are opposed to the holes, one end portions of the lead wires inserted into the lead wire inserting portion are positioned within the receptacle portion through the holes formed in the housing, and the terminals and the one end portions of the lead wires are connected together in the vicinity of the opening.

2. A rotational angle sensor according to claim 1, wherein the rotational quantity detecting mechanism comprises a rotary member supported on the rotary shaft and received in the receptacle portion, a slider supported by the rotary member, and a circuit board supported within the receptacle portion and formed with resistor and current collector patterns with which the slider is in contact, the plurality of terminals are supported on the circuit board, the circuit board being disposed perpendicularly to an axial direction of the rotary shaft, and the rotary member, the slider and the circuit board being arranged successively in this order from the opening toward an inner part of the receptacle portion.

3. A rotational angle sensor according to claim 2, wherein each of the plurality of terminals comprises a base portion extending perpendicularly to an axis of the rotary shaft and a connecting portion formed axially of the rotary shaft by bending one end of the terminal base portion, the connecting portions of the plurality of terminals being brought into abutment against the inner wall of the receptacle portion and are opposed to the holes formed in the housing, the connecting portions and one end portions of the lead wires being connected to each other, and an insulating wall is formed on the inner wall of the receptacle portion between adjacent the connecting portions of the terminals.

4. A rotational angle sensor according to claim 3, wherein the connecting portions of the terminals and the one end portions of the lead wires are connected together in a space range which the rotary member, the slider and the circuit board occupy axially of the rotary shaft within the receptacle portion.

5. A rotational angle sensor according to claim 4, further including a packing placed on an annular stepped portion formed in the inner wall of the receptacle portion, a cover which abuts the packing to close the opening of the receptacle portion, and a sealing member having elasticity and functioning to seal the holes with the lead wires passing therethrough, a peripheral edge portion of the opening of the receptacle portion is crushed to form a crushed portion in the housing, the cover being held grippingly by both the crushed portion and the annular stepped portion, thereby compressing the packing, and the sealing member being press-fitted into the lead wire inserting portion to seal the receptacle portion.

6. A rotational angle sensor comprising:

a cylindrical housing;

a partition wall formed within the housing;

a receptacle portion defined by the partition wall within the housing and having an opening;

an accommodating portion having an open portion and formed within the housing so as to be opposed to the receptacle portion through the partition wall;

a rotary shaft supported rotatably by the housing through a hole formed in the partition wall;

a rotational quantity detecting mechanism received in the receptacle portion to detect a rotational quantity of the rotary shaft;

a coiled spring accommodated in the accommodating portion and engaged at one end portion thereof with the housing; and a rotor formed with a pair of retaining portions, wherein a pair of stopper portions are provided in the housing along a peripheral edge of the open portion of the accommodating portion, an opposite end portion of the coiled spring is engaged with the rotor which is fixed onto the rotary shaft so as to close the open portion of the accommodating portion, one of the paired retaining portions is brought into abutment against one of the paired stopper portions by an urging force of the coiled spring, while the other retaining portion is made capable of abutting the other stopper portion, to constitute a stopper mechanism.

7. A rotational angle sensor according to claim 6, wherein the partition wall is formed with an annular portion within the accommodating portion, a first space is formed between the outside of the annular portion and the housing and a second space is formed inside the annular portion, the coiled spring is accommodated in the first space so that the one end portion of the coiled spring is engaged with the housing, and a sealing member is accommodated in the second space to seal the hole formed in the partition wall.

8. A rotational angle sensor according to claim 7, further including:

a packing placed on an annular stepped portion formed in an inner wall of the receptacle portion, and a cover which abuts the packing to close the opening of the receptacle portion, wherein a peripheral edge portion of the opening of the receptacle portion is crushed to form a crushed portion in the housing, the cover being held grippingly by both the crushed portion and the annular stepped portion, thereby compressing the packing, and the sealing member is accommodated in the second space to close the hole formed in the partition wall and seal the receptacle portion.

* * * * *